Jan. 12, 1971  M. D. BURRIDGE  3,554,021

PORTABLE TEST EQUIPMENT WITH EXTENDABLE DISPLAY MEANS

Filed June 30, 1969  3 Sheets-Sheet 1

INVENTOR.
MICHAEL D. BURRIDGE

BY John F. Lawler

ATTORNEY

United States Patent Office 3,554,021
Patented Jan. 12, 1971

3,554,021
PORTABLE TEST EQUIPMENT WITH
EXTENDABLE DISPLAY MEANS
Michael D. Burridge, Santa Barbara, Calif., assignor to
Sylvania Electric Products Inc., a corporation of Delaware
Filed June 30, 1969, Ser. No. 837,512
Int. Cl. A47b 45/00, 51/00; H05k 5/00
U.S. Cl. 73—116　　　　　　　　　　　　　　　5 Claims

ABSTRACT OF THE DISCLOSURE

Portable test equipment adapted to rest on the floor and having an instrument panel supported for vertical movement between a lower collapsed position and a upper or raised position. An inner housing contains heavy components of the test equipment and constitutes the mounting base for vertically movable telescoping rails to which a lightweight outer housing comprising the instrument panel is connected. Upwardly facing display means such as meters are permanently secured to the upper part of the vertically movable panel and are electrically connected by flexible cable to the components in the inner housing. When the instrument panel is in the lower position, the unit is compact and portable. When the panel is extended to the raised position, the display means are more easily read by the operator while the danger of tipping of the unit is minimized due to the low center of gravity.

BACKGROUND OF THE INVENTION

This invention relates to test equipment, and in particular to portable test equipment having display meters or the like associated therewith.

Portable test equipment such as an automobile exhaust gas analyzer normally has display meters mounted on the outer parts of the equipment so as to be readily visible to the operator. Such meters on test equipment intended for placement on a bench or table are easily readable because the meters are at or near eye-level of the operator. Equipment that is too heavy to be conveniently lifted from the floor, however, poses a problem of meter readability for the operator who must either stoop or bend over to make readings. This is quite tiresome and awkward, especially when numerous readings are to be taken. Alternatively, remotely positionable meters may be connected to the test equipment by long clip-on leads or the like, but such meters as separate elements are easily damaged and are awkward to handle and to package when the equipment is prepared for storage or transportation. Furthermore, separate meters take up part of the often limited space on work benches.

An object of this invention is the provision of portable test equipment with extendable display or readout devices conveniently and safely supported on the main body of the apparatus.

SUMMARY OF THE INVENTION

Floor supported test equipment has a lightweight instrument panel mechanically connected to the heavier main body of the equipment by vertically extendable side rails. Readout meters on the upper part of the panel are easily readable by the operator when the panel is elevated to and locked in the upper position vertically spaced above the main body of the equipment on the floor. The instrument panel forms part of the outer housing of the equipment.

DESCRIPTION OF PREFERRED EMBODIMENT

Figure 1:
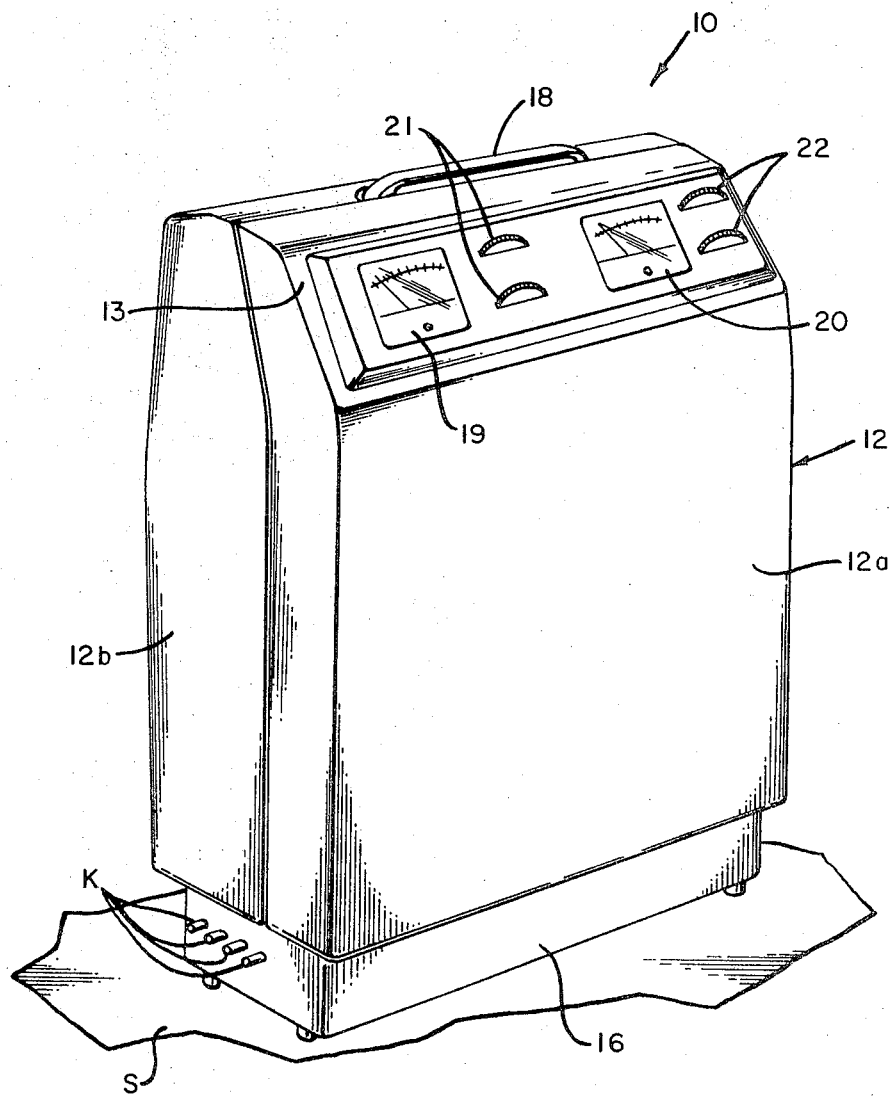
FIG. 1 is a front perspective view of test equipment embodying this invention, the instrument panel being shown in the lower position.

Referring now to the drawings, test equipment embodying the invention is generally indicated at 10 and comprises an outer housing 12 having a front panel 12a with an inclined upper surface 13 and a rear panel 12b, an inner housing 15 and a base 16 adapted to rest on a supporting surface S. Panels 12a and 12b preferably are molded or pressed lightweight plastic sheets and housing 15 is a structually rigid heavy gauge unit. Handle 18 secured to the top of inner housing 15 projects above the outer housing as shown in FIG. 1 for use in lifting and transporting the equipment from place to place.

Test equipment 10, for example, may be an automobile exhaust gas analyzer of the type used in garages and service stations and on the highways for measuring the concentration of carbon monoxide and hydrocarbons in automobile exhaust gas. In such equipment, inner housing 15 may contain heavy components such as a motor-pump unit M (see FIG. 3), cooler C, and power supply P in a lower compartment, and an analysis unit and associated parts including a gas cell E, optical transmitter T, detector D and appropriate circuitry in an upper compartment. Conduit F connected to base 16 carries exhaust gas to be analyzed into the inner housing and terminals K projecting from the side of the base provide access to external power and fluid supply sources. Inner housing 15 not only encloses but also physically supports the majority of the components of the entire assembly.

In accordance with this invention, display or readout meters 19 and 20 and associated controls 21 and 22, respectively, are mounted on the upper inclined surface 13 of the front panel 12a and are electrically connected to the circuits of analyzer units in inner housing 15 by a flexible cable 23 with sufficient slack to permit substantial relative movement between opposite connected ends thereof. Front panel 12a is supported for vertical movement on inner housing 15 by identical side rail assemblies 25 and 26.

Figure 2:
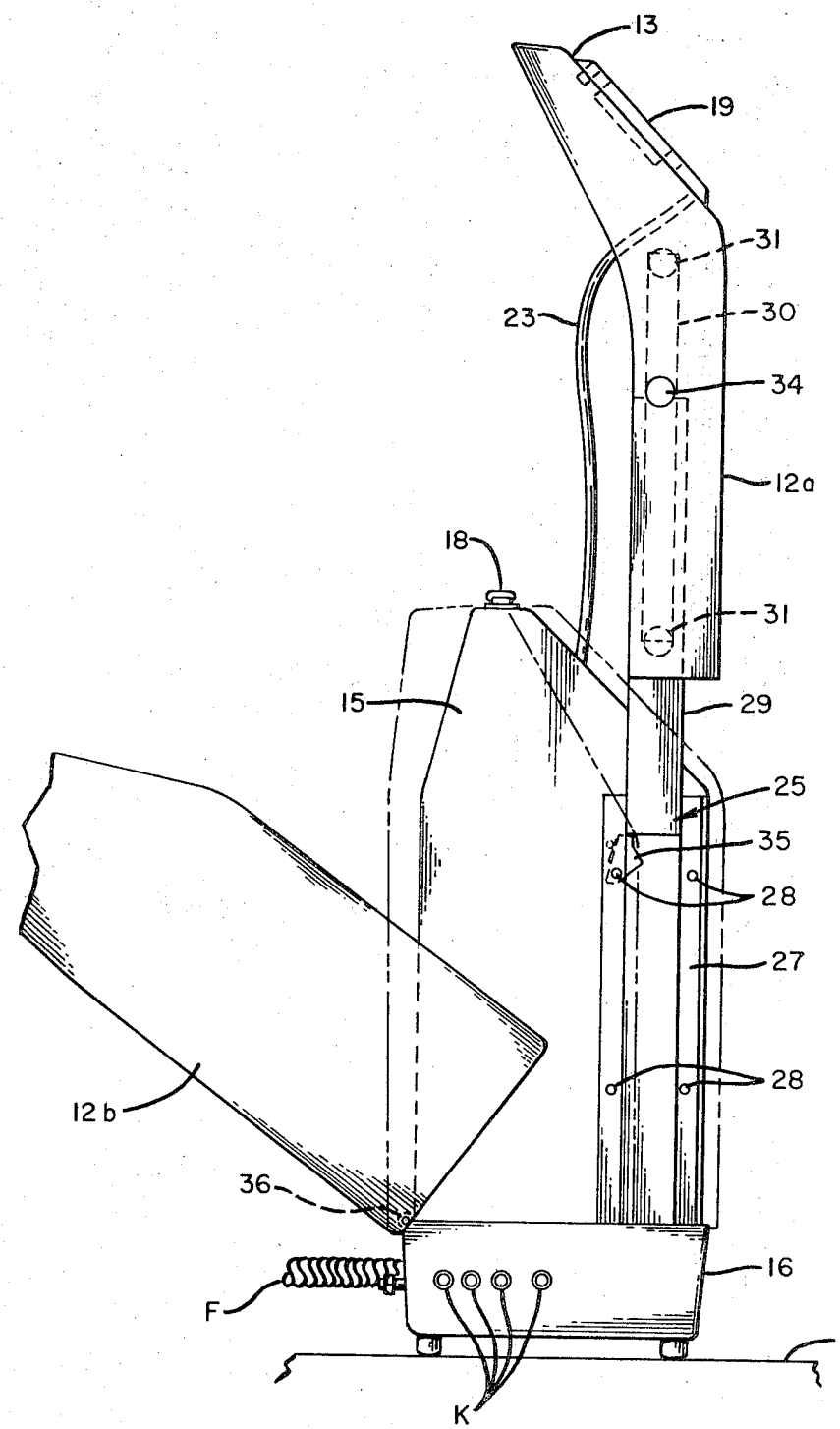
FIG. 2 is a side elevation of the test equipment showing the front meter-supporting panel in the elevated position.
Figure 3:
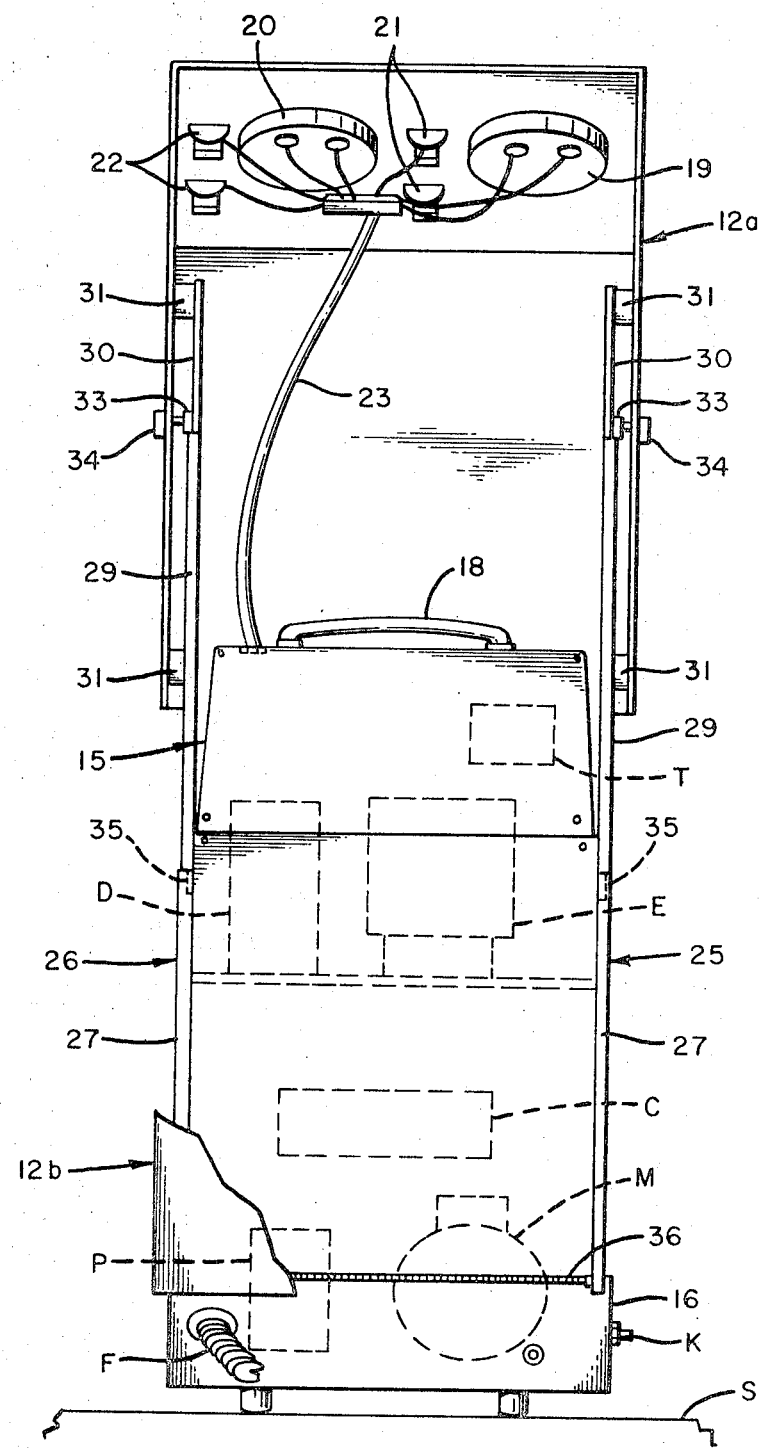
FIG. 3 is a rear view of the test equipment of FIG. 2 with a portion of the rear outer housing cut away for clarity of illustration.

Each rail assembly has an elongated stationary base 27 secured by screws 28 or the like to the side of inner housing 15 and movable bars 29 and 30 vertically slidably mounted in base 27 for movement between a fully telescoped position within the base and an extended position projecting from the upper end of base 27. Bar 30 is vertically slidable relative to bar 29 and is secured by spacer blocks 31 to the inner surface of sidewall 32 of front panel 12a. A spring loaded detent 33 on bar 30 engages the top of bar 29 when the rail assembly is fully extended and automatically locks the parts in this position. A release button 34 on panel sidewall 32 when pressed unlocks detent 33 to permit lowering of the panel 12a relative to the inner housing. Lock lever 35 automatically engages the lower end of bar 29 in the extended position as shown in FIGS. 2 and 3 and is cammed out of the locked position by descending bar 30. Spacer blocks 31 insure the desired clearance between panel 12a and inner housing 15 to permit relative vertical movement without interference. Rear outer housing panel 12b is pivoted by hinge 36 to the lower rear portion of base 16 to provide access to inner housing 15 and the components within it and preferably has an overall width and height corresponding to that of front panel 12a to give an appearance of a one-piece external housing, see FIG. 1.

The test equipment is useful in making the desired tests with the front panel 12a in either the lower or in the raised positions. With the panel in the lower position, the equipment is compact and portable but meters 19 and 20 and controls 21 and 22 may not be at a convenient height for the standing operator. To bring the meters and controls to such a height, the operator simply lifts front panel 12a until detents 33 lock the rail assemblies in their fully extended positions as shown in FIG. 2. The relatively heavy inner housing 15 provides a stable base to prevent tipping of the extended assembly and the lightweight instrument panel 12a is readily raised and lowered without strain on the operator. If desired, electrical interlocks may be included in the assembly to permit equipment operation only when panel 12a is in the raised position. By way of example, an exhaust gas analyzer embodying this invention which was constructed and successfully tested had a height of 24 inches in the collapsed position and an extended front panel height of 42 inches.

What is claimed is:

1. A portable test equipment cabinet comprising
    an inner housing containing a plurality of relatively heavy components,
    an outer housing of relatively lightweight sheet material comprising a separate front panel and a separate rear panel,
    display means mounted on the upper portion of said front panel and electrically connected to certain components in the inner housing,
    a pair of vertically extendable rail assemblies connecting opposite sides of said inner housing to adjacent parts of said front panel, each rail assembly comprising
        a base member secured to the inner housing,
        bar means supported on said base member for vertical movement between a collapsed position within said base member and an extended position projecting from the top of said base member, said bar means being mechanically connected to said front panel whereby the latter is movable vertically relative to the inner housing, and
        means for releasably locking said bar means in the extended position.

2. A test equipment cabinet according to claim 1 with a flexible cable electrically connecting said display means and said components, said cable having sufficient slack to permit traverse of the front panel vertically relative to the inner housing between the limits of vertical movement.

3. A test equipment cabinet according to claim 1 in which said rear panel is pivotally supported for movement away from said inner housing independently of said front panel, and a handle connected to the top of said inner housing between said front and rear panels.

4. A portable exhaust analyzer for measuring the concentration of compounds in exhaust gas from an internal combustion engine comprising
    a housing connectable to the exhaust gas output of said engine and adapted to rest on a supporting surface,
    gas analysis equipment in said housing operative to produce electrical outputs representative of the measured gas component concentrations,
    display apparatus electrically connected to said outputs of the analysis equipment and providing a visual readout of the measured component concentrations, and
    means for supporting said display apparatus on said housing for vertical movement between a lower position adjacent to the housing and an extended position vertically spaced above the housing.

5. The analyzer according to claim 4 in which said means comprises at least part of an outer housing,
    said display apparatus being permanently secured to said outer housing, and a pair of extensible rail assemblies connecting said outer housing to said first named housing.

References Cited

UNITED STATES PATENTS

| 2,749,747 | 6/1956 | Cline | 73—117 |
| 2,840,435 | 6/1958 | Campbell | 312—279 |
| 3,395,574 | 8/1968 | Mazurkevics et al. | 73—116 |

JAMES J. GILL, Primary Examiner

M. SMOLLAR, Assistant Examiner

U.S. Cl. X.R.

D26—1 (1.11); 73—117; 248—125; 312—223, 279; 317—120